United States Patent
Asmussen et al.

(10) Patent No.: US 10,249,344 B2
(45) Date of Patent: Apr. 2, 2019

(54) TAPE DRIVE CORROSION PROTECTION

(71) Applicant: International Business Machines Corporation, Armonk, NY (US)

(72) Inventors: Ole Asmussen, Henstedt-Ulzburg (DE);
Robert Beiderbeck, Wassenberg (DE);
Erik Rueger, Ockenheim (DE);
Markus Schaefer, Heiligenmoschel (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/475,201

(22) Filed: Mar. 31, 2017

(65) Prior Publication Data
US 2018/0286464 A1 Oct. 4, 2018

(51) Int. Cl.
*G11B 3/14* (2006.01)
*G11B 5/008* (2006.01)
*G11B 25/06* (2006.01)
*G11B 33/14* (2006.01)

(52) U.S. Cl.
CPC ........ *G11B 33/144* (2013.01); *G11B 5/00813* (2013.01); *G11B 25/06* (2013.01); *G11B 33/1453* (2013.01)

(58) Field of Classification Search
None
See application file for complete search history.

(56) References Cited

U.S. PATENT DOCUMENTS 5,341,262 A * 8/1994 Yamasaki et al. ........................... G11B 33/1453
360/128
6,433,965 B1 8/2002 Gopinathan et al.
7,027,250 B2 4/2006 Lau
7,525,774 B2 4/2009 Soda et al.
(Continued)

FOREIGN PATENT DOCUMENTS

JP 04305846 A * 10/1992 ............. G11B 33/14
JP 10199119 A * 7/1998 ............. G11B 19/04
(Continued)

OTHER PUBLICATIONS

Lee et al., Electrochemical Corrosion and Wear Behavior of an Ultra-Thin DLC Film Deposited on Different Annealing NI-P. Layers on ALMG Alloy in NACL Solution, Int. 1 Electrochem. Sci., 11 (2016) 5983-5998, doi: 10.20964/2016.07.06, pp. first page and 5984-5998, Retrieved from Internet: URL: http://www.electrochemsci.org/papers/vol11/110705983.pdf.
(Continued)

*Primary Examiner* — Craig A. Renner
(74) *Attorney, Agent, or Firm* — Schmeiser, Olsen & Watts, LLP; Mark Vallone

(57) ABSTRACT

A system and method for corrosion protection of a tape drive. The system includes: the tape drive, a temperature sensor, a heating entity and a controller for activating the heating entity. The method includes: establishing, via the temperature sensor, temperature information indicative of a temperature in an area of, or within, the tape drive; receiving the temperature information at the controller; and activating the heating entity in a manner dependent on the temperature information established via the temperature sensor in order to prevent corrosion within the tape drive.

4 Claims, 6 Drawing Sheets

(56) References Cited

U.S. PATENT DOCUMENTS

| | | |
|---|---|---|
| 8,035,929 B2 | 10/2011 | Kawakita et al. |
| 8,867,176 B1 | 10/2014 | Nibarger et al. |
| 8,947,826 B2 | 2/2015 | Bhatia et al. |
| 9,053,718 B1 | 6/2015 | Adrong et al. |
| 9,431,033 B1 * | 8/2016 | Iben et al. ............ G11B 5/3106 |
| 2015/0380028 A1 | 12/2015 | Bradshaw et al. |

FOREIGN PATENT DOCUMENTS

| | | | | |
|---|---|---|---|---|
| JP | 11162039 A | * | 6/1999 | ............. G11B 15/00 |
| JP | 11238269 A | * | 8/1999 | ............ G11B 15/087 |
| JP | 2001250371 A | * | 9/2001 | ............. G11B 33/14 |

OTHER PUBLICATIONS

Rismania et al., An Ultrathin Multilayer TIN/SIN Wear Resistant Coating for Advanced Magnetic Tape Drive Heads, Retrieved from Internet: URL: http://www.sciendedirect.com/science/article/pii/S0040609014000923, Corresponding author. Tel.: + 65 6516 7216; fax: + 65 6779 1103. Copyright © 2014 Elsevier B.V. Published by Elsevier B.V. All rights reserved., 2 pages.

* cited by examiner

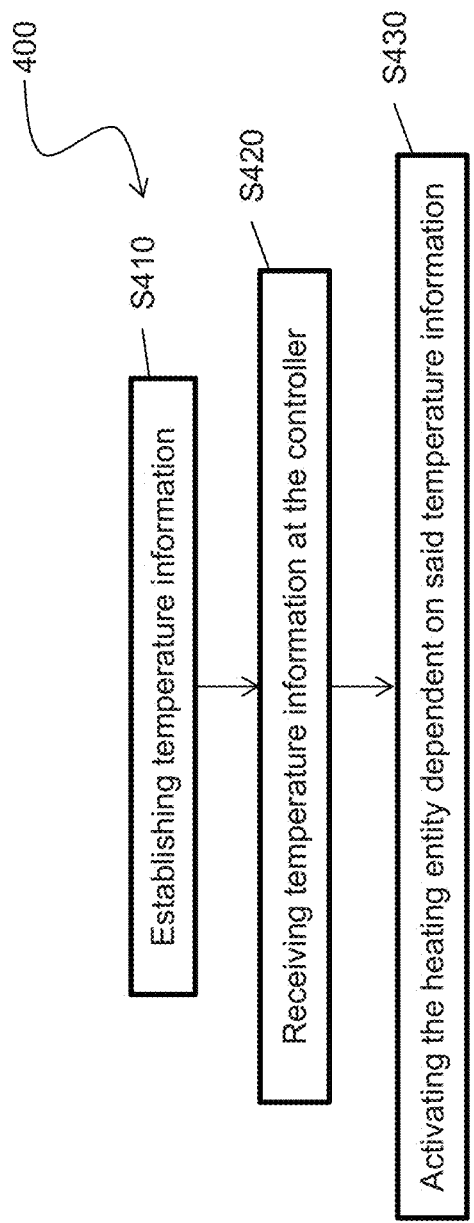

TAPE DRIVE CORROSION PROTECTION

The present invention relates to prohibiting corrosion within a tape drive, and more specifically to prohibiting corrosion within a tape drive via a heating entity.

BACKGROUND

Corrosion within a tape drive tends to occur over time.

SUMMARY

Embodiments of the present invention provide a system for corrosion protection of a tape drive. The system comprises: a temperature sensor for measuring a temperature in an area of, or within, the tape drive; a heating entity for heating at least a portion of the tape drive; and a controller coupled with the heating element, said controller configured to receive temperature information from the temperature sensor and to activate the heating entity dependent on the temperature information provided by the temperature sensor in order to prevent corrosion within the tape drive.

Embodiments of the present invention provide a method for corrosion protection of a tape drive based on a tape drive corrosion protection system. The system comprises a tape drive, a temperature sensor, a heating entity and a controller for activating the heating entity. The method comprises: establishing, via the temperature sensor, temperature information indicative of a temperature in an area of, or within, the tape drive; receiving the temperature information at the controller; and activating the heating entity in a manner dependent on the temperature information established via the temperature sensor in order to prevent corrosion within the tape drive.

BRIEF DESCRIPTION OF THE DRAWINGS

In the following, embodiments of the invention are explained in greater detail, by way of example only, making reference to the drawings.

FIG. 7 is a flow diagram of a method for preventing corrosion effects within a tape drive, in accordance with embodiments of the present invention.

DETAILED DESCRIPTION

Figure 1:
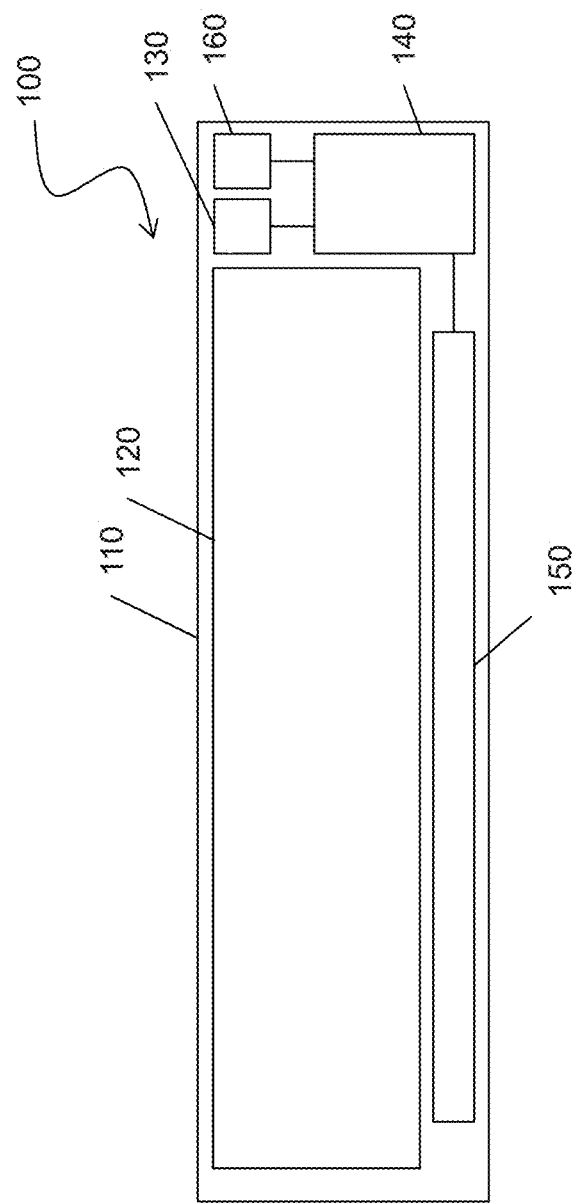
FIG. 1 illustrates a side view of a tape drive system, in accordance with embodiments of the present invention.

The present invention may include the following example features.

According to an example embodiment of a corrosion protection system, a controller is configured to determine if temperature information provided by a temperature sensor indicates that the temperature decreased by a certain temperature value within a certain time period. It has been found out that temperature drops above a certain temperature drop value per time period lead to increased corrosion within the tape drive. For example, a critical value for a temperature drop value may be 10° C. or more per one hour. The skilled person may understand that corrosion depends on multiple parameters. So, the invention should not be construed as limited to the previous example of temperature drop value per time period. The temperature drop value can be chosen according to certain environmental conditions.

According to an example embodiment of the corrosion protection system, the controller is configured to deactivate the heating entity such that the temperature increase caused by the heating entity is lower than the temperature decrease determined before activating the heating entity. Thereby, the heating entity does not compensate any temperature decrease within the tape drive but the heating entity only reduces the temperature decrease gradient; i.e., a rapidly falling temperature slope is mitigated. Thereby corrosion effects within the tape drive, specifically at the tape drive head, can be avoided.

According to an example embodiment of the corrosion protection system, the system comprises a humidity sensor, wherein the controller is configured to provide electric power to the heating entity dependent on humidity information provided by a humidity sensor. So, not only temperature information may be taken into account but also humidity information, specifically information regarding relative humidity in or close to the tape drive.

According to an example embodiment of the corrosion protection system, the controller is adapted to activate the heating entity if humidity information provided by the humidity sensor indicates that humidity is above a certain humidity threshold value. Corrosion effects typically occur if humidity is above a certain humidity threshold value. So, based on the humidity information, the system may only gather temperature information if humidity exceeds the predefined humidity threshold value. The humidity threshold value can be chosen according to certain environmental conditions.

According to an example embodiment of the corrosion protection system, the heating entity is included within the tape drive system. More in detail, the heating entity will be integrated in the frame, chassis or housing of the tape drive system. Thereby, heat can be directly provided to portions of the tape drive which are most affected by corrosion effects; e.g., the tape drive head.

According to an example embodiment of the corrosion protection system, the heating entity is a planar heating entity being arranged between a tape drive housing and one or more tape drive components. Thereby, an improved integration of the heating entity into the tape drive is possible.

According to an example embodiment of the corrosion protection system, the heating entity extends across at least half of the base area of the tape drive. By using a heating entity with a base area which covers a major portion of the tape drive base area, the heating entity can be driven at a lower temperature for achieving a certain heating effect within the tape drive.

According to an example embodiment of the corrosion protection system, the heating entity is a heating pad comprising multiple heating elements. For example, the heating pad may comprise a closed pouch or bag in which said heating elements are included. The heating pad may be glued to an inner side of the tape drive housing by means of an adhesive layer.

According to an example embodiment of the corrosion protection system, the heating entity is a heating pad comprising a thermal conductive fluid or gel, wherein said heating elements are included in said thermal conductive fluid or gel. By means of said thermal conductive fluid or gel, the heat provided by the heating elements is distributed across the heating pad base area.

According to an example embodiment of the corrosion protection system, the heating entity comprises a height lower than 5 mm; e.g., lower than 3 mm. Thereby, the integration of the heating entity into the tape drive is significantly simplified.

According to an example embodiment of the corrosion protection system, the temperature sensor and/or a humidity sensor are included within the tape drive. Thereby the temperature and/or humidity can be determined in close proximity to the components which should be protected against corrosion. According to other embodiments, the temperature sensor and/or a humidity sensor are external sensors arranged outside the tape drive.

According to an example embodiment of the corrosion protection system, the controller is included within the tape drive. According to other embodiments, the controller is an external controller arranged outside the tape drive.

According to an example embodiment of the corrosion protection method, establishing temperature information comprises establishing multiple temperature information indicative for the temperature in the area or within the tape drive at different consecutive points of time. The temperature information can be derived continuously or in a sampled manner. Thereby it is possible to determine the temporal temperature profile.

According to an example embodiment of the corrosion protection method, establishing temperature information comprises detecting a temperature drop above a certain temperature drop value within a certain period of time. Corrosion of components of the tape drive mostly occur under certain thermal conditions, namely a sudden decrease of temperature (e.g., greater than 10° C. per hour) paired with high humidity (e.g., greater than 60%), Therefore, monitoring of the temperature with the goal of detecting a detrimental temperature drop is advantageous for determining environmental conditions which favors tape drive corrosion.

According to an example embodiment of the corrosion protection method, the method further comprises the step of determining humidity information by means of a humidity sensor. Thereby a second factor can be monitored which favors tape drive corrosion, namely humidity.

According to an example embodiment of the corrosion protection method, the heating entity is activated if humidity information provided by a humidity sensor indicates that the humidity is above a certain humidity threshold value and if established temperature information indicates a temperature drop above a certain temperature drop value within a certain period of time. Thereby, environmental factors which are responsible for tape drive corrosion can be observed and the heating entity is activated only in those cases in which corrosion effects may occur with significant probability.

According to an example embodiment of the corrosion protection method, the controller receives temperature information regarding a temperature drop from a first temperature value to a second temperature value and said heating entity provides heat to the tape drive such that the temperature within the tape drive rises to a temperature value above the second temperature value but below the first temperature value. Thereby the heating entity does not prevent a temperature decrease within the tape drive but lowers the gradient of the temperature decrease.

According to an example embodiment of the corrosion protection method, the controller activates the heating entity such that a drop of ambient air temperature of the environment surrounding the tape drive from a first temperature value to a second temperature value is mitigated within the tape drive. Thereby corrosion can be prevented with reduced thermal heating and therefore reduced energy.

The term "tape drive" as used in the present disclosure may relate to any tape drive device forming an exchangeable unit in a computer or storage system.

The term "tape drive system" as used in the present disclosure may relate to a system comprising a tape drive and—optionally—any component (e.g., sensor or controller) arranged outside the tape drive.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In a broad sense, the present invention generally relates to methods and systems for corrosion protection within tape drives. Mainly during summer time, an increasing replacement rate of tape drives can be observed. Failure analysis indicates that the main cause of failure is a low temperature/high humidity scenario. More in detail, in case of high humidity, cold wet air may deposit at tape drive components, specifically the tape drive head and condenses. As a result, one or more tape drive components, specifically the read/write elements of the tape drive start to corrode within a short period of time. The corrosion causes a degradation of read/write function which may cause a failure. Such failure can be fixed only by exchanging the tape drive, which is expensive and time consuming.

FIG. 1 illustrates a side view of a tape drive system 100, in accordance with embodiments of the present invention. The tape drive system 100 comprises a frame or chassis 110 in which tape drive components 120 (e.g., tape drive head, tape guiding means, driving means, tape receiving means, etc.) are arranged. Tape drive system 100 further comprises a temperature sensor 130, a controller 140 and a heating entity 150. In addition, the tape drive system 100 may comprise a humidity sensor 160 for measuring relative humidity (RH). The controller 140, the heating entity 150 and/or the humidity sensor 160 may be integrated in the frame or chassis 110 or may be external components which provide their functional features via one or more respective interfaces to the tape drive components 120 included in the frame or chassis 110. For example, the functionality of the controller 140 may be implemented by a control entity included in the frame or chassis 110 or the functionality may be provided by an external control entity. Similarly, the heating entity 150 and/or the humidity sensor 160 may be integrated within the frame or chassis 110 or may an external entity/sensor (e.g., heating entity is an external blower)

The temperature sensor 130 may be electrically coupled with the controller 140 for providing temperature information to the controller 140. For example, the temperature sensor 130 may provide an electrical signal to the controller 140 which depends on the temperature in or close to the frame or chassis 110. So, the temperature sensor 130 may be arranged in or close to the frame or chassis 110.

The controller 140 may be electrically coupled with the heating entity 150. The controller 140 may be configured to activate the heating entity 150 depending on temperature information provided by the temperature sensor 130. More in detail, the controller 140 may activate the heating entity 150 in case that a certain drop of temperature (i.e., certain temperature drop within a given time window equal to or higher than a certain temperature difference threshold value) has been recognized. The monitoring of temperature variations is advantageous because sudden temperature drops within a short period of time cause condensation of water within the tape drive which causes corrosion.

The heating entity 150 may heat at least a portion or subgroup of the tape drive components 120 thereby mitigating the temperature drop within the tape drive and thereby avoiding corrosion of tape drive components 120. The heating entity 150 may at least provide heat to the tape drive head which is more affected by corrosion effects than is any other portion of the tape drive. However, according to embodiments, the heating entity may be included in the frame or chassis 110 and may span over a significant part of the base area of the tape drive in order to provide distributed heat to the tape drive components 120.

Figure 2:
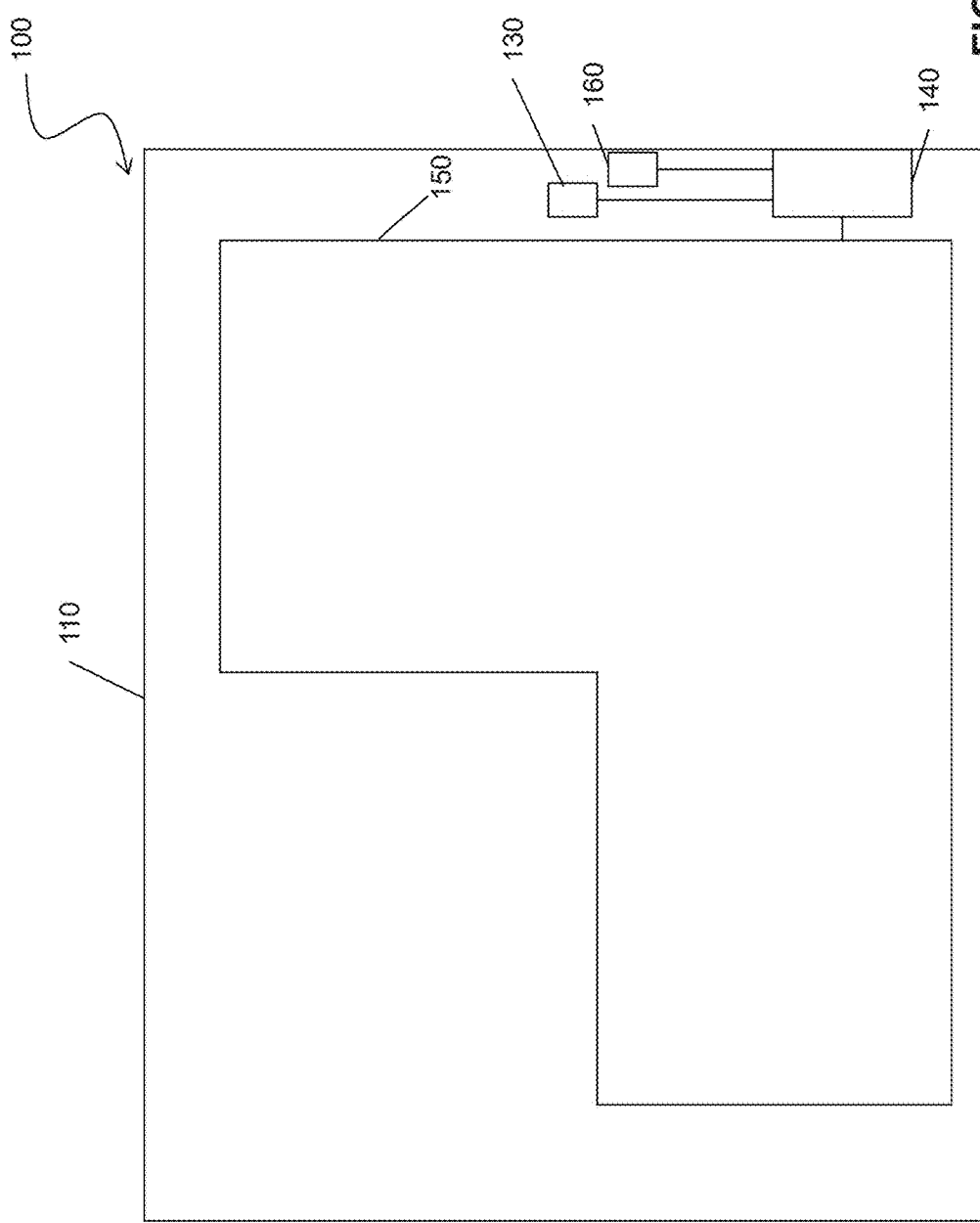
FIG. 2 illustrates a top view of the tape drive system of FIG. 1, in accordance with embodiments of the present invention.

FIG. 2 illustrates a top view of the tape drive system 100 of FIG. 1, in accordance with embodiments of the present invention. The heating entity 150 may be a planar heating entity which extends across the major part of the base area of the frame or chassis 110. The heating entity 150 may, for example, cover an L-shaped base area. The base area may be chosen such that the heating entity 150 extends along the tape drive components 120 to be protected against corrosion. The heating entity 150 may cover at least, for example, 50%, 60%, 70%, or 80% of the base area of the tape drive. According to embodiments, the slot in which the tape is inserted is not covered by the heating entity 150. The heating entity 150 may be configured to provide heat to the whole, or essentially the whole, path of the tape.

Figure 3:
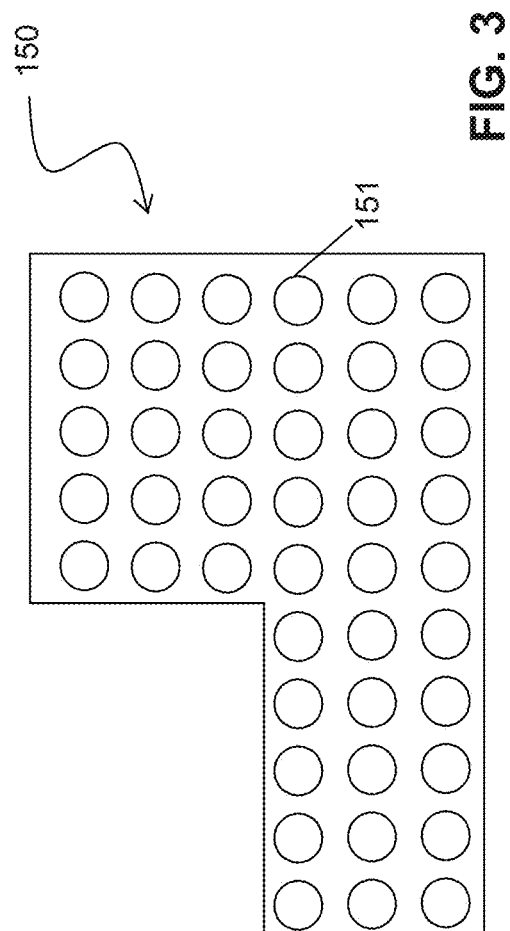
FIGS. 3 and 4 show a heating entity comprising multiple heating elements in a schematic top view and side view, respectively, in accordance with embodiments of the present invention.
Figure 4:
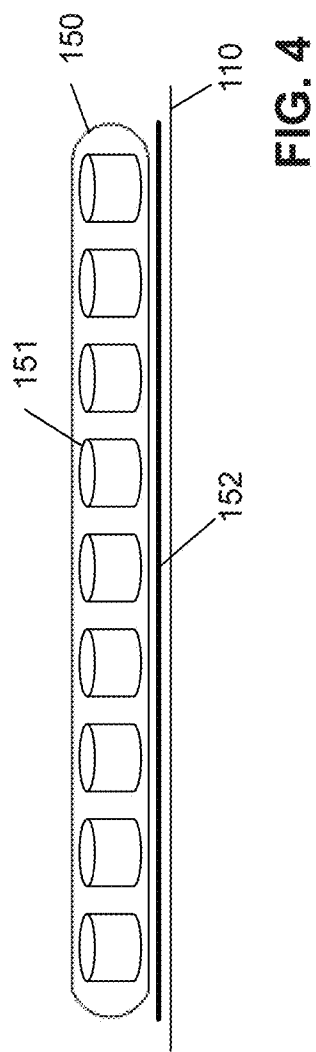

FIGS. 3 and 4 show the heating entity 150 comprising multiple heating elements in a schematic top view and side view, respectively, in accordance with embodiments of the present invention. The heating entity 150 may comprise a heating pad. The heating pad may comprise multiple heating elements 151. The heating elements 151 may be arranged in a matrix-like manner e.g., arranged in rows and columns) in order to provide space distributed heat to the tape drive components 120. In order to increase the heat distribution, the heating entity 150 may comprise a liquid-tight pouch which is filled with a thermally conductive gel or fluid.

The heating entity 150 may comprise a height h of 5 mm or less (e.g., 3 mm or less) in order to enable an integration of the heating entity 150 between the frame or chassis 110 and the tape drive components 120, specifically between a bottom chassis plate and an electronic board within the frame or chassis 110. As shown in FIG. 4, the heating entity 150 may be arranged at the frame or chassis 110; e.g., by means of an adhesive layer 152.

Figure 5:
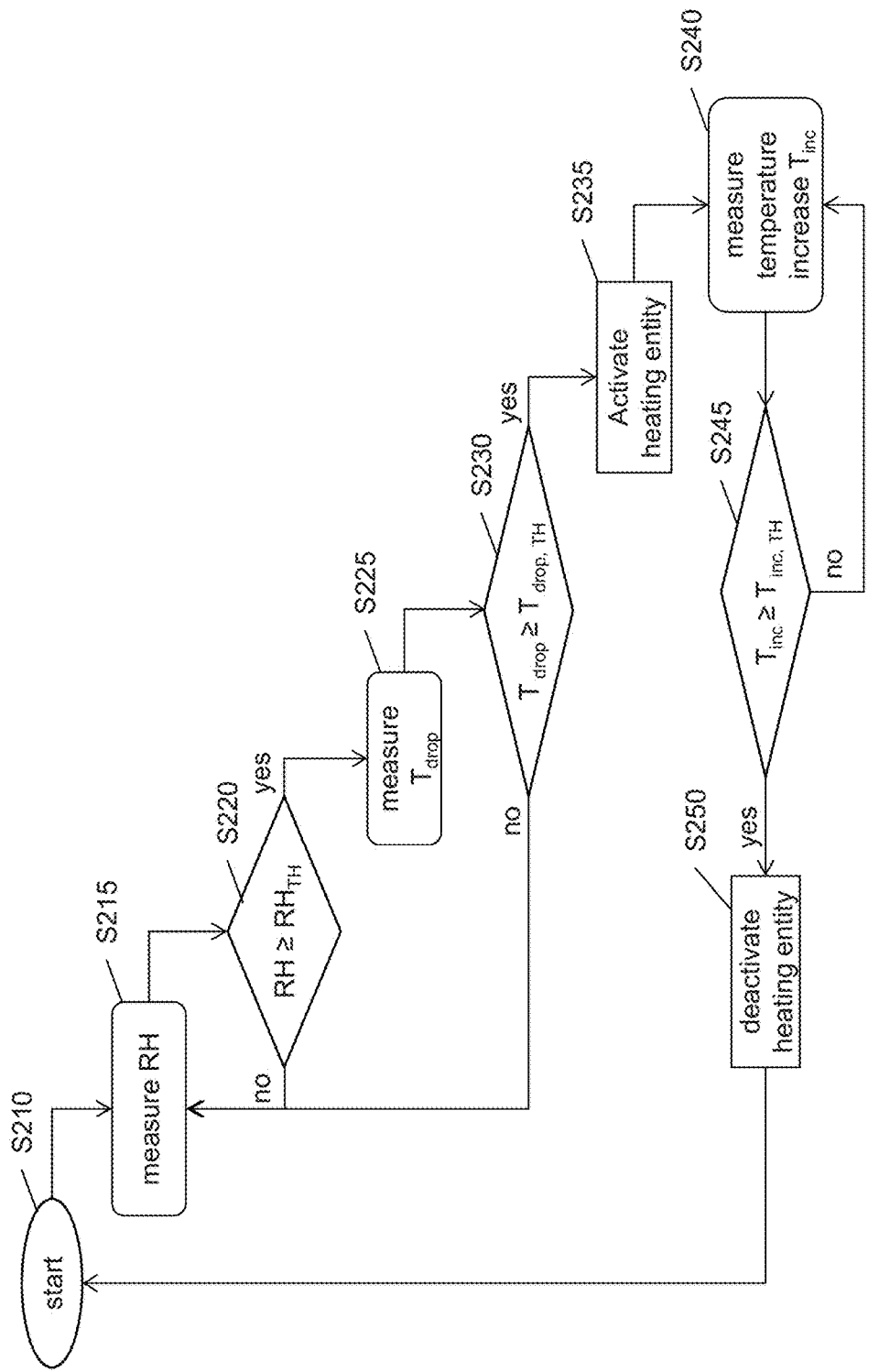
FIG. 5 is a flow diagram that illustrates a first embodiment of a method for controlling the heating entity of the tape drive system, in accordance with embodiments of the present invention.

FIG. 5 is a flow diagram that illustrates a first embodiment of a method for controlling the heating entity 150 of the tape drive system 100, in accordance with embodiments of the present invention. After starting the control method (step S210), the relative humidity RH may be measured by means of the humidity sensor 160 (step S215). The humidity sensor 160 may be electrically coupled with the controller 140 in order to provide information regarding the relative humidity, in the following referred to as humidity values, within the frame or chassis 110 or close to the frame or chassis 110 to the controller 140. The information regarding the relative humidity may be processed by the controller 140 continuously or at certain time steps.

The controller 140 may compare the relative humidity values RH with a relative humidity threshold value RHTH (step S220). For example, RHTH may be 60%. If RH does not exceed RHTH, the measurement cycle of RH is continued. If RH exceeds RHTH, a temperature drop Tdrop is measured (step S225). Temperature drop Tdrop may be indicative of the decrease of temperature within a certain time window. For example, the controller may be configured to decide whether the temperature decrease is 10° C. or more within one hour. When temperature drops by 10° C. or more within one hour, there is a high risk of corrosion. If temperature drop Tdrop is below a temperature drop threshold value Tdrop,TH per period of time (e.g., 10° C. per one hour), the method my return to step S215 and may proceed with measuring the relative humidity RH. If is Tdrop is above a given temperature drop threshold value Tdrop,TH (step S230), the controller may activate the heating entity 150 (step S235). By activating the heating entity 150, the temperature within the tape drive is rising thereby avoiding the risk of corrosion of tape drive components, specifically the tape drive head.

By means of the temperature sensor 130, the temperature increase Tinc within the tape drive can be measured (step S240). The controller may be configured to determine whether the temperature increase Tinc is equal or above a certain temperature increase threshold value T inc,TH (step S245). In one embodiment, the temperature increase threshold value T inc,TH may be chosen such that the temperature increase provided by the heating entity 150 is lower than the temperature drop Tdrop which is measured in step S225. Thereby, the heating entity 150 does not totally compensate the temperature decrease but mitigates only the gradient of temperature decrease; i.e., the temperature within the tape drive decreases with a lower gradient in order to avoid corrosion due to condensation effects. If the temperature increase Tinc has not reached. T inc,TH, then heating entity 150 stays activated and temperature increase Tinc measurement is performed. If temperature increase Tinc is equal to or higher than T inc,TH, then heating entity 150 is deactivated (step S250) and the control method returns to step S210.

Figure 6:
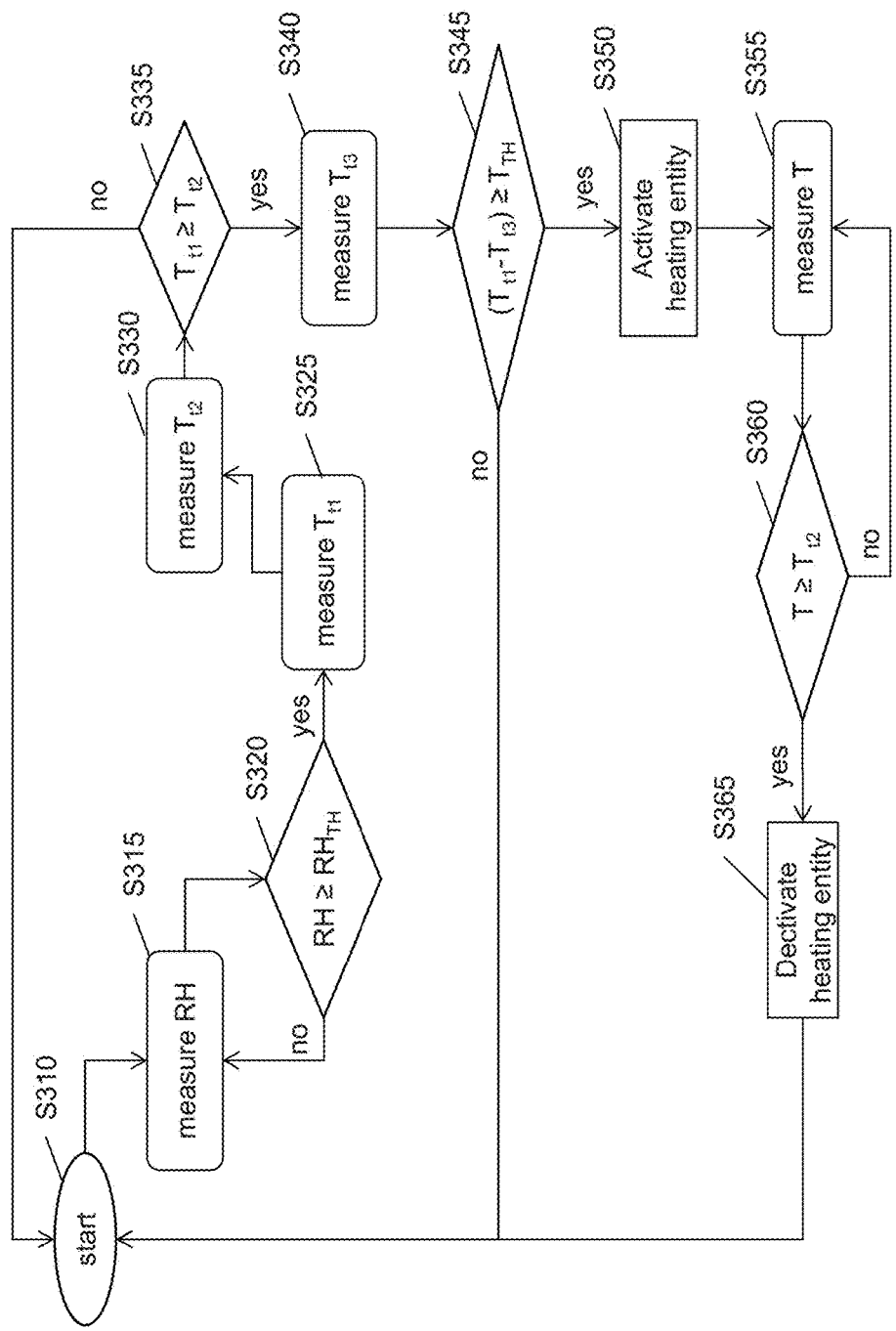
FIG. 6 is a flow diagram that illustrates a second embodiment of a method for controlling the heating entity of the tape drive system, in accordance with embodiments of the present invention.

FIG. 6 is a flow diagram that illustrates a second embodiment of a method for controlling the heating entity 150 of the tape drive system 100, in accordance with embodiments of the present invention. After starting the control method (step S310), the relative humidity RH may be measured by means of the humidity sensor 160 (step S315). The relative humidity RH may be processed by the controller 140 continuously or at certain time steps.

The controller 140 may compare the relative humidity values RH with a relative humidity threshold value RHTH (step S320). For example, RHTH may be 60%. If RH does not exceed RHTH, the measurement cycle of RH is continued. If RH exceeds RHTH, a temperature drop Tdrop is measured. The temperature drop Tdrop may be determined based on successive temperature measurements at different points of time. For example, at a first point of time t1, temperature Tt1 is measured in step S325 and at a second point of time t2, temperature Tt2 is measured in step S330. Temperature measurements may be performed according to a certain measurement schedule. The schedule may be configured to measure the temperature within the tape drive at certain time intervals; e.g., every x minutes, wherein x is chosen between 1 and 10. For example, x may be 6 minutes. At step S335, the controller determines if the temperature T between points of time t1 and t2 decreased. If not, the method returns to start step S310.

If Tt2 is lower than Tt1, temperature Tt3 is measured at further point of time t3 (step S340). In step S345 it is decided whether the difference of temperatures at points of time t1 and t3 exceeds a temperature threshold value TTH. If not, method returns to start step S310. If so (i.e., TTH>(Tt1-Tt3)), the heating entity 150 is activated by the controller in step S350. Activating the heating entity 150 causes the temperature within the tape drive to increase, thereby avoiding the risk of corrosion of tape drive components, specifically the tape drive head.

By means of the temperature sensor 130, the temperature increase within the tape drive can be measured (step S355). The controller may be adapted to determine whether the temperature T is equal or above a certain temperature value, for example, the temperature value Tt2 at point of time t2 (step S360). If not, heating entity 150 stays activated and measurement of temperature T is performed in step S355. If temperature T is equal or higher than Tt2, heating entity 150 is deactivated (S365) acid the control method returns to step S310. By heating the tape drive to a temperature below the temperature which was measured as a first temperature measurement value, a temperature decrease within the tape drive is not prevented but the temperature decrease is mitigated; i.e., the gradient of temperature decrease is reduced. Thereby the temperature within the tape drive follows temperature drops in a smoother way which prevents condensation and therefore unwanted corrosion.

FIG. 7 is a flow diagram of a method 400 for preventing corrosion effects within a tape drive, in accordance with embodiments of the present invention. First, temperature information is established (step S410). The temperature information may be provided by a temperature sensor 130 and may be indicative of the temperature within the tape drive. The temperature information may be received at the controller 140 (step S420). A heating entity 150 associated with the tape drive, (e.g., included in the tape drive) is activated dependent on the temperature information provided by the temperature sensor 130 (step S430).

Summing up, a system and a method for preventing corrosion with a tape drive have been presented. The system/method is advantageous because the failure rate of tape drives can be significantly reduced thereby enhancing tape drive reliability and lowering effort and costs for replacement of defective tape drives.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for corrosion protection of a tape drive based on a tape drive corrosion protection system, the system comprising the tape drive, a temperature sensor, a heating entity and a controller for activating the heating entity, said method comprising:

determining, via a humidity sensor, humidity information;

establishing, via the temperature sensor, temperature information indicative of a temperature in an area of, or within, the tape drive;

receiving the temperature information at the controller; and activating the heating entity in a manner dependent on the temperature information established via the temperature sensor in order to prevent corrosion within the tape drive, said activating the heating entity being in response to a determination that the humidity information determined via the humidity sensor indicates that the relative humidity is above a specified relative humidity threshold value and the established temperature information indicates a temperature drop above a specified temperature drop value within a specified period of time.

2. The method of claim 1, wherein said establishing temperature information comprises establishing temperature information indicative of the temperatures $T_{t1}$ and $T_{t2}$ in the area of, or within, the tape drive at different consecutive points in time t1 and t2, respectively, wherein t2 is later in time than t1, and wherein the method further comprises:

determining whether or not $T_{t2}$ is less than $T_{t1}$.

3. The method of claim 1, said method further comprising:

said controller activating the heating entity such that a drop of ambient air temperature of an environment surrounding the tape drive from a first temperature value to a second temperature value is reduced within the tape drive.

4. A method for corrosion protection of a tape drive based on a tape drive corrosion protection system, the system comprising the tape drive, a temperature sensor, a heating entity and a controller for activating the heating entity, said method comprising:

establishing, via the temperature sensor, temperature information indicative of a temperature in an area of, or within, the tape drive;

receiving the temperature information at the controller; and activating the heating entity in a manner dependent on the temperature information established via the temperature sensor in order to prevent corrosion within the tape drive;

said controller receiving temperature information regarding a temperature drop from a first temperature value to a second temperature value; and said heating entity providing heat to the tape drive such that the temperature within the tape drive rises to a temperature value above the second temperature value but below the first temperature value.

\* \* \* \* \*